(12) United States Patent
Deruelle (10) Patent No.: US 11,046,020 B2
(45) Date of Patent: Jun. 29, 2021

(54) SYSTEM AND METHOD FOR PRODUCING STRUCTURAL THERMOPLASTIC PARTS

(71) Applicant: STELIA AEROSPACE, Rochefort (FR)

(72) Inventor: Romain Deruelle, Albert (FR)

(73) Assignee: STELIA AEROSPACE, Rochefort (FR)

( * ) Notice: Subject to any disclaimer, the term of this patent is extended or adjusted under 35 U.S.C. 154(b) by 216 days.

(21) Appl. No.: 16/297,336

(22) Filed: Mar. 8, 2019

(65) Prior Publication Data

US 2019/0275747 A1 Sep. 12, 2019

Related U.S. Application Data

(60) Provisional application No. 62/645,382, filed on Mar. 20, 2018.

(30) Foreign Application Priority Data

Mar. 9, 2018 (FR) ........................................ 1852086

(51) Int. Cl.
*B29C 65/00* (2006.01)
*B29C 70/00* (2006.01)
(Continued)

(52) U.S. Cl.
CPC ............ *B29C 66/721* (2013.01); *B29C 65/70* (2013.01); *B29C 66/81455* (2013.01);
(Continued)

(58) Field of Classification Search
CPC ......... B29C 65/00; B29C 65/70; B29C 66/00; B29C 66/70; B29C 66/72; B29C 66/721;
(Continued)

(56) References Cited

U.S. PATENT DOCUMENTS

| 8,741,208 B2 * | 6/2014 | Nothdurft | ............... B29C 70/48 264/544 |
| 2015/0013894 A1 * | 1/2015 | Matsen | ................... B29C 33/06 156/272.4 |

FOREIGN PATENT DOCUMENTS

WO WO 2010/118923 A2 10/2010
WO WO 2015/082813 A1 6/2015

OTHER PUBLICATIONS

Search Report from French Intellectual Property Office on corresponding FR application (FR 1852086) dated Oct. 26, 2018.

* cited by examiner

*Primary Examiner* — Jacob T Minskey
*Assistant Examiner* — Matthew Hoover
(74) *Attorney, Agent, or Firm* — Klein, O'Neill & Singh, LLP (57) ABSTRACT

A system for producing at least one structural thermoplastic part, said structural thermoplastic part being formed from a rough part comprising reinforcing fibres immersed in a thermoplastic matrix, the structural thermoplastic part to be produced comprising an outer face and an inner face, opposite the outer face, the production system comprising at least one inflatable pressure member made of a material having a thermal resistance greater than the heating temperature, the inflatable pressure member being mounted between the first counter-mould and the second mould, the inflatable pressure member being configured to develop between the deflated idle state and an inflated state to flatten the rough part between the imprint of the first mould and the imprint of the first counter-mould so as to consolidate the rough part and to form the structural thermoplastic part.

13 Claims, 6 Drawing Sheets

(51) Int. Cl.
  *B29C 65/70* (2006.01)
  *B29C 70/44* (2006.01)
  *B29L 31/30* (2006.01)

(52) U.S. Cl.
  CPC ..... *B29C 70/446* (2013.01); *B29L 2031/3082* (2013.01); *B29L 2031/3085* (2013.01)

(58) Field of Classification Search
  CPC ....... B29C 66/80; B29C 66/81; B29C 66/814; B29C 66/8145; B29C 66/81455; B29C 70/00; B29C 70/40; B29C 70/44; B29C 70/446
  See application file for complete search history.

SYSTEM AND METHOD FOR PRODUCING STRUCTURAL THERMOPLASTIC PARTS

TECHNICAL FIELD

The present invention relates to the field of producing aeronautical parts and relates more specifically to a device for producing large thermoplastic parts intended to form the structure of an aeroplane.

The term "large" is used to describe the fact that one of the dimensions of the aeronautical part is greater than 5 m.

In a known manner, an aeroplane comprises a primary structure through which pass mechanical forces, and a secondary structure mounted on the primary structure. In this regard, the primary structure in particular comprises the fuselage, delimiting the body of the aeroplane and defining the structural casing thereof, the airfoil, comprising two wings, making it possible to ensure the lift of the aeroplane in flight, and the tailplane placed at the rear of the aeroplane and making it possible to ensure the stability thereof.

The primary structure comprises, in particular, several side rails. According to the state of the art, a side rail has a U-shaped cross-section so as to have increased rigidity. In a known manner, a side rail is made of a metal material, for example aluminium. However, a metal material has the disadvantage of being heavy, and the side rails are therefore today generally made of a composite material.

In a known manner, a side rail made of composite material is produced by impregnating reinforcing fibres in a thermosetting matrix. Such a thermosetting matrix is frozen by polymerisation, i.e. by means of a chemical reaction during which the matrix passes from the liquid or viscous state to the solid state under the effect of heat. When the thermosetting matrix is hot, it is moulded in order to obtain the desired shape, as is the case, for example, of U-shaped side rails, for which it is necessary to bend the two side arms. For this, the thermosetting composite part is moulded, for example, by thermocompression in an autoclave. In a known manner, an autoclave is a sealed enclosure, wherein the pressure and the temperature can be controlled and increased so as to press the composite material between a mould and a counter-mould, for example while heating the assembly, in order to give to the produced part the final shape thereof. However, such an autoclave has limited dimensions, which does not make it possible for the production of large parts, like for example, side rails of an aeroplane wing, which must hold in a confined enclosure. In addition, such composite parts take a long time to produce. The polymerisation is achieved by heating, for example, at 180° C. for a duration greater than 8 hours. The production rate is therefore low.

Also, there is a desire to replace the thermosetting matrix composite parts with thermoplastic matrix composite parts. The production cycle of such a part is shorter, but has the disadvantage of having to be heated at very high temperatures, which could go up to 410° C. in order to consolidate the composite part.

To form such a part, the reinforcing fibres are immersed in the thermoplastic matrix, and then the assembly is heated and positioned between two moulds to be shaped, for example, in a press, applying a significant pressure on all of the moulds by means of one or more hydraulic actuators. However, such a production method has the disadvantage of requiring a perfect alignment of the two moulds positioned opposite one another, in order to limit the risks of deformation of the part, as well as an equivalent pressure over the whole length of the moulds, so as to compress all of the mould, which is complex to implement for the production of large parts. Also, the production parts according to the prior art do not make it possible to produce large parts, like for example, a one-piece side rail.

According to the prior art, to date there is no alternative method to the autoclave, making it possible for the quicker production of parts made of thermoplastic composite material. In addition, no method to date makes it possible to produce large parts. Indeed, the production of long parts made of a single piece, makes it possible to limit seals due to the assembly of several parts, thus making it possible to limit the presence of fragile zones in the primary structure of an aeroplane.

One of the aims of the present invention is to propose a device and a method for producing simple, quick and effective thermoplastic parts, making it possible to produce long parts, from a single piece, without requiring the use of an autoclave.

WO2015/082813A1 discloses a method for gluing, by an adhesive layer, a leading edge on a blade making it possible to both impose a constant pressure on the adhesive layer throughout the production cycle, to control the thickness of such an adhesive layer, by preferably making it possible for the application of a constant thickness. Such a document does not relate to the production of thermoplastic parts, but only aims to harden an adhesive layer.

US2015/013894 A1 presents a method for forming composite structures of hollow shape by the reinforcement of thermoplastic fibres. It discloses the use of a metal member, to support the thermoplastic structure, of which the shape varies according to the pressure and does not make it possible to specifically define the surface of the composite structure.

SUMMARY

To this end, the invention relates to a system for producing at least one structural thermoplastic part, intended to be integrated to a primary structure of an aeroplane, said structural thermoplastic part being formed from a rough part comprising reinforcing fibres immersed in a thermoplastic matrix, the structural thermoplastic part to be produced comprising an outer face and an inner face, opposite the outer face, the production system comprising:

a first mould, comprising an inner imprint to form the outer face of the thermoplastic part to be produced, a first counter-mould comprising an outer imprint intended to form the inner face of the thermoplastic part to be produced, the rough part being intended to be mounted between the first mould and the first counter-mould, a second mould configured to be mounted opposite the first mould, a device for closing the moulds so as to prevent a gap between them, a device for heating the rough part to a heating temperature greater than the melting temperature of the thermoplastic matrix so as to make it malleable, at least one inflatable pressure member made from a material having a thermal resistance greater than the heating temperature, the inflatable pressure member being mounted between the first counter-mould and the second mould, the inflatable pressure member being configured to develop between a deflated idle state and an inflated stress state, wherein the inflatable pressure member is configured to flatten the rough part between the imprint of the first mould and the imprint of the first counter-mould, so as to consolidate the rough part and to form the structural thermoplastic part.

Advantageously, such a production system makes it possible to produce long parts made of thermoplastic material without requiring any autoclave or a press to punch the thermoplastic parts. The use of an inflatable pressure member makes it possible to adapt to different shapes of thermoplastic parts to be produced to reduce the porosity of a rough part of which the thermoplastic matrix is in the malleable state, because of the heating. Thanks to the invention, the production system has a reliable and robust structure, and makes it possible for the high-rate production of long thermoplastic parts. Indeed, the heating can be done over a short duration, which differs from a thermosetting matrix.

The term "consolidate" is used to describe the decreasing the porosity of the part and ensuring the cohesion of the thermoplastic material.

Preferably, the imprint of the first mould has a length greater than 5 m.

Thanks to the invention, the production system makes it possible to produce long parts from one single piece, making it possible to limit the joints and the weak zones. Advantageously, such a mould/counter-mould has a reduced cost compared with a punch press or with an autoclave. In addition, all that is needed is to adapt the imprints of the mould and of the counter-mould to obtain the desired shape.

Preferably, the inflatable pressure member is configured to resist a heating temperature at least equal to 350° C., preferably, at least equal to 380° C., more preferably of 450° C., more preferably still of 600° C. Such an inflatable pressure member is particularly suitable for the compression of a porous thermoplastic matrix.

Preferably, the inflatable pressure member is made from a material of the polyimide or silicone type. Advantageously, such a material resists very high temperatures and has excellent demoulding properties, the inflatable pressure member being removed easily and quickly. Such an inflatable pressure member makes it possible for the casing thereof to be deformed to apply a homogenous flattening force, limiting the risk of defects.

Preferably, the inflatable pressure member is inflated at an inner pressure of between 1 bar (1000 hPa) and 15 bars (15000 hPa), preferably, between 7 bars (7000 hPa) and 12 bars (12000 hPa).

According to an aspect of the invention, when the pressure member is made of polyimide, the material of the inflatable pressure member has a thickness of between 25 µm and 100 µm, preferably of around 50 µm, so as to ensure a compromise between resistance to heat/pressure and flexibility.

According to another aspect of the invention, when the pressure member is made of silicone, the material of the inflatable pressure member has a thickness of between 1 mm and 7 mm, preferably of around 5 mm.

According to an aspect of the invention, the second mould comprising a second imprint, said production system comprising a second counter-mould, mounted between the inflatable pressure member and the second mould, the inflatable pressure member is configured to, in the stressed state thereof, flatten both a first rough part between the first counter-mould and the first mould and a second rough part between said second counter-mould and the second mould so as to make it possible for the simultaneous production of two structural thermoplastic parts.

Such a production system makes it possible to simultaneously produce two thermoplastic parts with one single pressure member. This advantageously makes it possible to increase productivity, while improving the depreciation of the inflatable pressure member, of which the cost is increased.

Preferably, the first counter-mould comprises a first part and a second part which are connected by means for adjusting the gap, preferably, a flexible portion. Thus, the volume of the first counter-mould can be reduced to cooperate with a rough part comprising a narrow cavity because of the porosity thereof, which facilitates the assembly of the counter-mould. In addition, during the flattening by the inflatable pressure member, the first counter-mould extends to consolidate the rough part and to obtain the desired dimensions.

According to an aspect of the invention, the inflatable pressure member has an overall parallelepiped shape.

Preferably, the inflatable pressure member comprises, in the idle state, at least one inner fold. During the inflating, the casing of the inflatable pressure member expands and the length of the inner fold decreases to mould the shape of the counter-mould and to apply a homogenous flattening force. In the idle state, the volume of the inflatable pressure member is reduced, which facilitates the cooperation thereof with a counter-mould. Such a fold makes it possible to enable a deformation of the casing, even if the inflatable pressure member is not made of a stretch material.

Preferably, the inflatable pressure member comprises at least one access opening making it possible for the inflating and the deflating of the inflatable pressure member.

According to an aspect of the invention, the first counter-mould is made of a material having a thermal expansion which is similar to that of the rough part so as to make it possible for an optimal flattening. Preferably, the first counter-mould is made of an organic polymer material, mineral polymer material or an organic/inorganic matrix composite material or metal material. The first counter-mould is in the solid state. Such a material advantageously makes it possible to "absorb" the folds of the pressure member in order to not form them on the rough part.

The invention also relates to a production method by the production system, such as presented above, of a structural thermoplastic part from a rough part, the rough part being positioned between the imprint of the first mould and the imprint of the first counter-mould, the inflatable pressure member being in a deflated idle state, said method comprises:
a step of heating the thermoplastic matrix of the rough part so as to make it malleable, and
a step of inflating the inflatable pressure member in an inflated stressed state, wherein the inflatable pressure member flattens the rough part between the imprint of the first mould and the imprint of the first counter-mould so as to consolidate the rough part and to form the structural thermoplastic part.

BRIEF DESCRIPTION OF DRAWINGS

The invention will be better understood upon reading the following description, given only by way of an example, and with reference to the appended drawings, wherein.

It should be noted that the figures describe the invention in a detailed manner to implement the invention, said figures could, of course, naturally also be used to best define the invention, as necessary.

DETAILED DESCRIPTION

In a known manner, a structural thermoplastic part, intended to be integrated to a primary structure of an aeroplane, is formed from a rough part.

Figure 1:
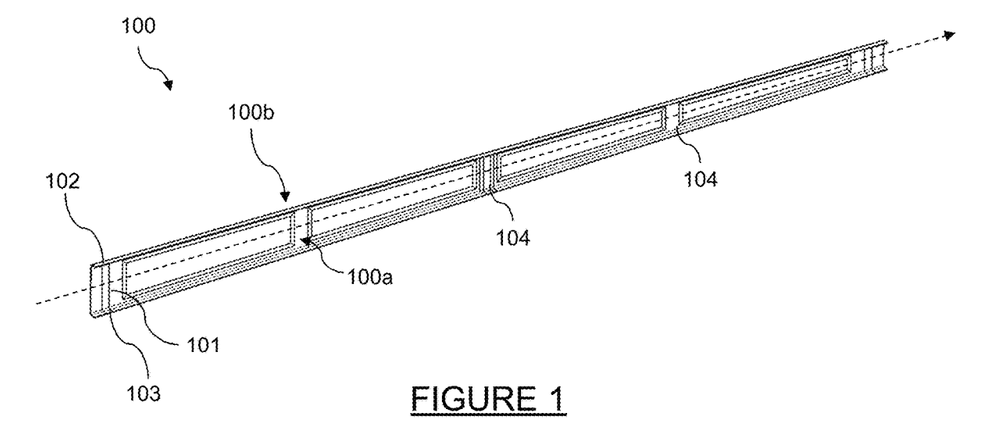
FIG. 1 is a schematic representation of a structural thermoplastic part of an aeroplane wing.

In this example, in reference to FIG. 1, the structural thermoplastic part to be produced 100 has a U-shaped section defining a bottom wall 101 and two side walls 102, 103 extending orthogonally to the bottom wall 101. According to an embodiment example, the bottom wall 101 has a variable thickness and a variable width. The thermoplastic part to be produced 100 comprises a plurality of stiffeners 104 making it possible to stiffen the walls 101, 102, 103 thereof, while limiting the weight thereof. Preferably, the thermoplastic part to be produced 100 comprises an outer face 100b and an inner face 100a which are defined with respect to the inner cavity of the U, of which the thermoplastic part 100 is shaped. In a more specific manner, the thermoplastic part to be produced 100 comprises three inner surfaces (an inner face of the bottom wall 101 and an inner face of each of the side walls 102, 103) and three outer surfaces (an outer face of the bottom wall 101 and an outer face of each of the side walls 102, 103).

Figure 2:
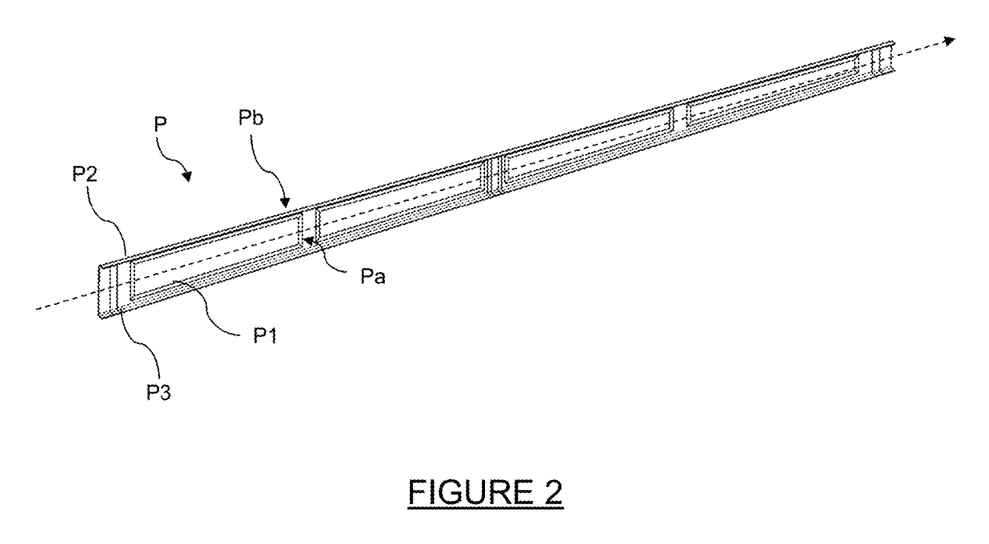
FIG. 2 is a schematic representation of a rough part to produce the thermoplastic part of FIG. 1.

In reference to FIG. 2, a rough part P is represented, intended to form the thermoplastic part 100. The rough part P comprises reinforcing fibres immersed in a thermoplastic matrix. As an example, the reinforcing fibres are made of carbon and the matrix is made of PEEK or PEKK. Similarly, the rough part P comprises a bottom wall P1 and two side walls P2, P3 which define an outer face Pb and an inner face Pa. The rough part P has a significant porosity which must be reduced.

As indicated above, in order to obtain a finished thermoplastic part 100, the rough part P must be heated at a temperature greater than the melting temperature of the thermoplastic matrix, while being compressed in order to increase the density thereof and to be stiffened. The rough part P has a flexibility which makes it possible for it to mould the shape of the surface which supports it, as will be presented below. In a known manner, the rough part P is made by draping reinforcing fibres flat or three-dimensionally. In this example, the rough part P is three-dimensional.

The production system 1 according to the invention advantageously makes it possible to produce thermoplastic parts 100 such as described above, simply and quickly from rough parts P. Advantageously, increased production rates can be obtained.

Figure 5:
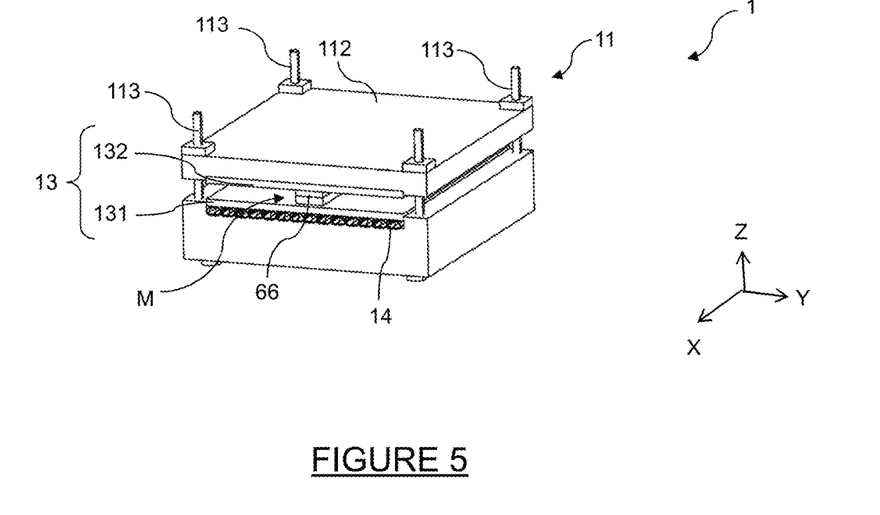
FIG. 5 is a schematic representation of a production system according to an embodiment of the invention, FIG. 6A schematically represents a first mould.

With reference to FIG. 5, a production system 1 according to a preferred embodiment of the invention is represented, which comprises a closing device 11 wherein is mounted a moulding module M.

Figure 3:
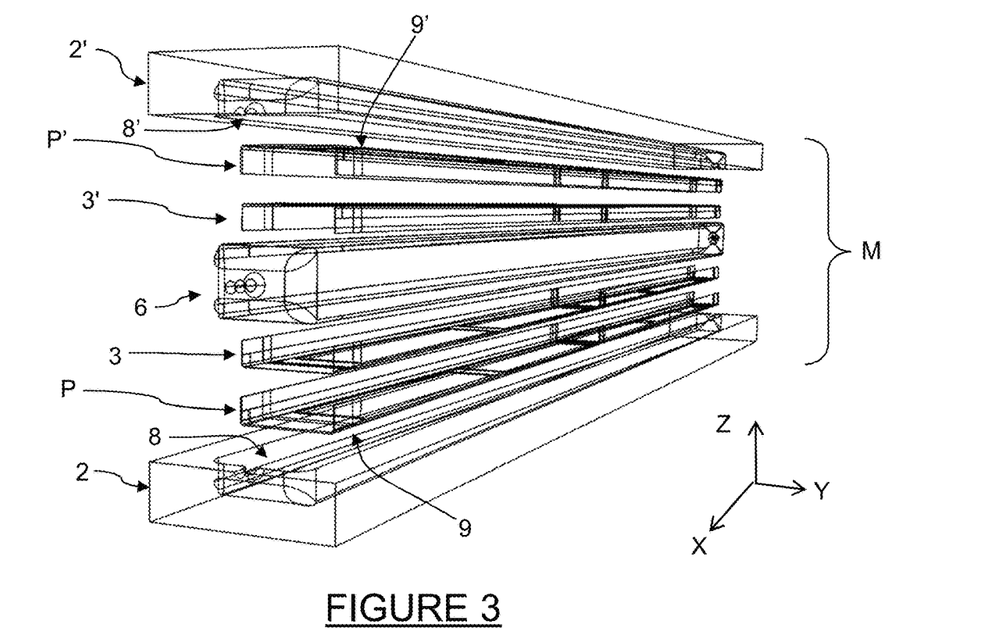
FIG. 3 is a perspective schematic representation of a moulding module according to the invention for the simultaneous production of two thermoplastic parts.
Figure 4:
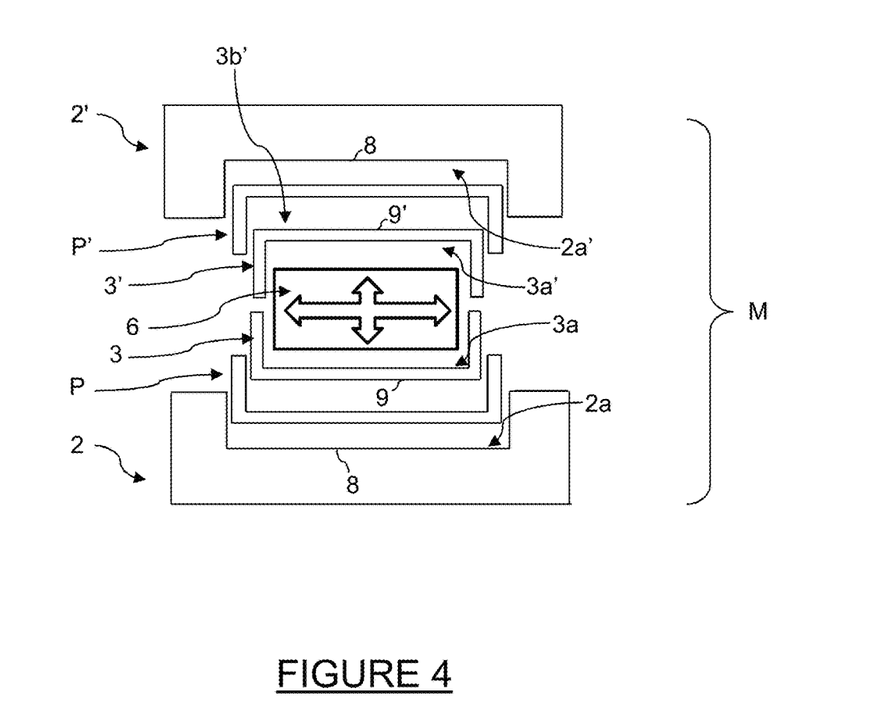
FIG. 4 is a schematic, cross-sectional representation of a moulding module according to the invention.

As illustrated in FIGS. 3 and 4, the moulding module M comprises:

a first mould 2, comprising an imprint 8 of the outer face 100b of a first thermoplastic part to be produced 100, a second mould 2' configured to be mounted opposite the first mould 2, the second mould 2' comprising an imprint 8' of the outer face 100b' of a second thermoplastic part to be produced 100', a first counter-mould 3 comprising an imprint 9 of the inner face 100a of the first thermoplastic part to be produced 100, a second counter-mould 3' comprising an imprint 9' of the inner face 100a' of the second thermoplastic part to be produced 100', and an inflatable pressure member 6, mounted between the first counter-mould 3 and the second counter-mould 3' configured, on the one hand, to press the first counter-mould 3 against the first mould 2 and, on the other hand, to press the second counter-mould 3' against the second mould 2'.

In this embodiment, the moulding module M makes it possible for the simultaneous formation of a first thermoplastic part 100 and of a second thermoplastic part 100'. However, the invention also applies for the production of one single thermoplastic part 100.

As illustrated in FIG. 5, the moulding module M extends, in this example, longitudinally along an axis X, laterally along an axis Y and vertically along an axis Z, so as to form a marker (X, Y, Z). Below, the terms "upper" and "lower" are defined with respect to the vertical axis Z, which is oriented from bottom to top, i.e. from a lower position to an upper position.

As illustrated in FIG. 3, the production system 1 comprises a first mould 2 and a second mould 2' which are mounted opposite one another. Preferably, the moulds 2, 2' are configured to cooperate together in the closed position, so as to form a sarcophagus which can be inserted in the closing device 11 as will be presented below. In this example, the moulds 2, 2' comprise pins to cooperate together, but naturally the moulds 2, 2' could be connected by different connecting members, for example magnets, hooks or any other member making it possible for the removable connection of the first mould 2 with the second mould 2'.

In this example, the first mould 2 and the second mould 2' are positioned opposite one another. The moulds 2, 2' are identical for producing identical thermoplastic parts or symmetrical for producing symmetrical parts, in particular a left part and a right part. Also, for purposes of brevity and clarity, only the first mould 2 will be presented in detail, below.

Figure 6A:
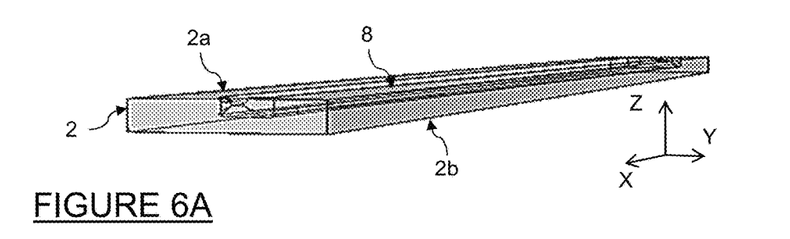
Figure 6B:
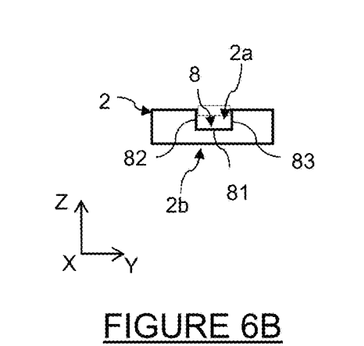
FIGS. 6B and 6C are cross-sectional views in different projection planes of the mould of FIG. 6A, FIGS. 7A and 7B schematically represent a first embodiment of a counter-mould, FIGS. 7C and 7D schematically represent a second embodiment of a counter-mould, FIG. 8A schematically represents a pressure member, FIGS. 8B and 8C schematically represent a cross-sectional view of the pressure member in an idle state and in a stressed state.
Figure 6C:
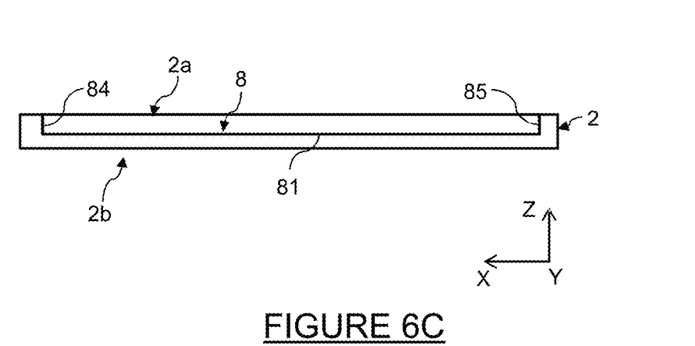

As represented in FIGS. 6A to 6C, the first mould 2 has a substantially rectangular parallelepiped shape and is preferably formed in a metal material, such as steel or an iron and nickel alloy (for example, Invar). Such a mould 2 is configured to resist both high pressures, of up to 15 bars (15000 hPa) and high temperatures, which could reach 600° C. The first mould 2 has dimensions advantageously making it possible to produce a thermoplastic part 100 up to 5 m long in a single piece and in one single operation.

Likewise, the first mould 2 has a sufficient thickness to make it possible for the formation of the imprint 8 so as to make it possible to insert the rough part P. As illustrated in FIG. 6A, the first mould 2 comprises an outer face 2b and an inner face 2a, wherein is formed the imprint 8. The outer face 2b is preferably flat and is configured to cooperate with the closing device 11 to block the moulding module M. The inner face 2a comprises an imprint 8, configured to cooperate with the outer face Pb of the rough part P to form the outer face 100b of the thermoplastic part to be produced 100.

With reference to FIG. 6B, the imprint 8 is presented in the form of a cavity having a U-shaped cross-section defining a bottom wall 81 and two side walls 82, 83. As illustrated in FIG. 6C, the imprint 8 also has two end walls 84, 85, which are formed at the longitudinal ends thereof. It goes without saying, that the shape of the imprint 8 can be adapted to the thermoplastic part to be produced 100. The dimensions of the imprint 8 of the first mould 2 correspond to the outer dimensions of the thermoplastic part to be produced 100 so as to make it possible for the formation of a thermoplastic part 100 with the desired dimensions.

Advantageously, the production system 1 comprises a device for closing 11 the moulds 2, 2', so as to prevent a gap between them, in particular during the inflating of the pressure member 6.

In this example, with reference to FIG. 5, the closing device 11 comprises a lower blocking member 111 and an upper blocking member 112 mounted mobile in translation with respect to the lower blocking member 111 along the vertical direction Z, in particular, thanks to guiding members 113. Preferably, the closing device 11 is presented in the form of a pneumatic press.

The closing device 11 makes it possible to reduce the risk of misalignment of the moulds 2, 2' and consequently, the risks of defects during production.

The alignment stresses of the blocking members 111, 112 are low compared with those of a punch press which imposes a perfect correspondence of the imprints during each punch of the press. Also, such a closing device 11 has a reduced cost. In the present case, the closing device 11 makes it possible mainly to prevent a gap between the moulds 2, 2', the inflatable pressure member 6 being responsible for the compression force.

In order to make it possible to form the thermoplastic part to be produced 100, the production system 1 further comprises a heating device 13, heating the first mould 2 and the second mould 2'. Preferably, the heating device 13 is configured to achieve a heating of up to the melting temperature of the thermoplastic matrix of the rough part, in particular up to a temperature of 600° C.

In this example, with reference to FIG. 5, the heating device 13 comprises a lower heating member 131 mounted on the lower blocking member 111 and an upper heating member 132 mounted on the upper blocking member 112. Preferably, each heating member 131, 132 is presented in the form of a plate comprising a plurality of heating resistances. Each heating member 131, 132 is configured to come directly into contact with a mould 2, 2' in order to heat it by thermal conduction. Naturally, the heating device 13 could only comprise one single heating member 131, 132.

Naturally, the heating device 13 could be presented in a different form, in particular, to achieve a heating by induction. Also naturally, the heating device 13 could be disconnected from the closing device 11.

Preferably, as illustrated in FIG. 5, the closing device 11 comprises complementary flattening means 14, in particular inflatable coils, which are situated between the lower blocking member 111 and the lower heating member 131. Such complementary flattening means 14 make it possible to flatten closely the lower heating member 131 with the first mould 2, in order to rectify any gap between the blocking members 111, 112. This is particularly advantageous when the parts to be produced have a length greater than 5 m.

Similarly to the two moulds 2, 2', the first counter-mould 3 and the second counter-mould 3' are positioned opposite one another in the mould M assembly presented in FIG. 3. The counter-moulds 3, 3' are identical for producing identical thermoplastic parts or symmetrical for producing symmetrical parts, in particular, a left part and a right part. Also, only the first counter-mould 3 will be presented in detail below in this document.

As represented in FIGS. 7A to 7D, the first counter-mould 3 has a U-shaped cross-section defining a bottom wall 31 and two side walls 32, 33. The first counter-mould 3 is preferably formed in an organic polymer material, a mineral polymer material or an organic/inorganic matrix composite material or a material of which the thermal coefficient is low (for example, around $1.5.10^{-6}$ $K^{-1}$), so as to not be deformed under the effect of the heat. Such a material furthermore makes it possible to smooth the rough part P when it is shaped to produce the thermoplastic part 100 and advantageously makes it possible to limit the formation of roughness or involuntary folds due to the pressure of the counter-mould 3 on the thermoplastic part to be produced 100.

Figure 7A:
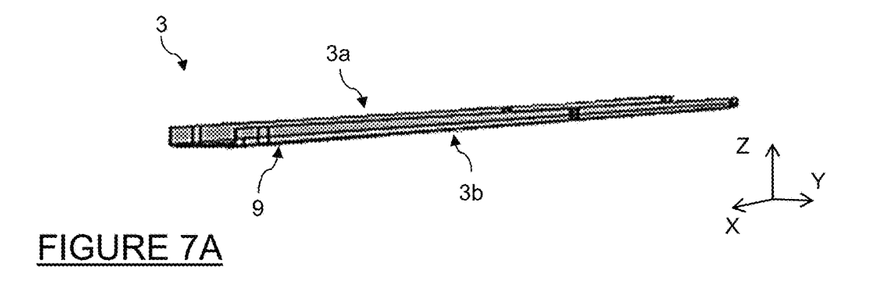
Figure 7B:
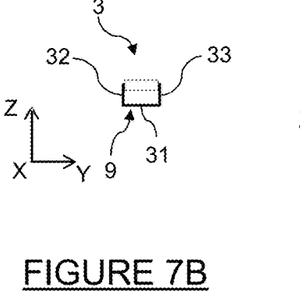

The first counter-mould 3 furthermore has dimensions configured to make it possible to insert the first counter-mould 3 in the cavity of the U of which the rough part P has the form.

As illustrated in FIG. 7A, the first counter-mould 3 comprises an outer face 3b intended to come into contact with the rough part P and an inner face 3a intended to come into contact with an inflatable pressure member 6. In particular, the outer face 3b is configured to cooperate with the inner face Pa of the rough part P. The outer face 3b comprises an imprint 9 of the inner face 100a of the thermoplastic part to be produced 100. In this example, the imprint 9 extends over the outer face 3b of all the walls 31, 32, 33 of the first counter-mould 3. Preferably, the dimensions of the imprint 9 are identical to the inner dimensions of the abovementioned thermoplastic part to be produced 100. Thus, when the rough part P is stressed and heated between the imprint 8 of the first mould 2 and the imprint 9 of the second mould 2', the rough part P is deformed in order to decrease the porosity thereof and mould the shape of the imprints 8, 9.

Figure 7C:
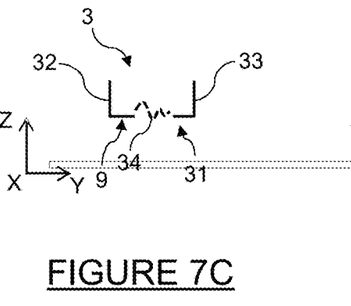
Figure 7D:
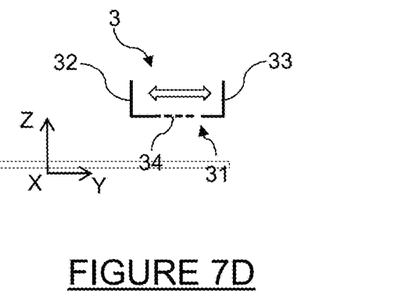

According to a preferred aspect of the invention, with reference to FIGS. 7C and 7D, the bottom wall 31 of the first counter-mould 3 comprises clearance means configured to make the width of the bottom wall 31 vary and, consequently, to vary the side clearance between the side walls 32, 33. In this embodiment, the clearance means are presented in the form of a flexible portion 34.

Such clearance means are particularly advantageous during the assembly of the first counter-mould 3 in the rough part P. Indeed, given that the rough part P has an increased porosity, the side walls P2, P3 have a greater thickness than those 102, 103 of the finished thermoplastic part 100. Also, the cavity of the U of the rough part P is narrower than that of the finished thermoplastic part 100. Thanks to the clearance means, the first counter-mould 3 can easily be inserted in the inner cavity of the U of the rough part P by compressing the flexible portion 34 as illustrated in FIG. 7C.

During production, the inflatable pressure member 6 spreads apart the side walls 32, 33 of the counter-mould 3 and extends the flexible portion 34 to optimally flatten the side walls P2, P3 of the rough part P and to obtain the desired thickness. Such a characteristic makes it possible to increase the production rates.

Naturally, the clearance means could be presented in a different form, for example in the form of two portions configured to slide against one another.

As described above, the mould M assembly comprises an inflatable pressure member 6 being presented, in this example, in the form of a bladder balloon and configured to flatten, on the one hand, a first rough part P between the imprint of the first mould 2 and the imprint of the first counter-mould 3 and, on the other hand, a second rough part P' between the imprint of the second mould 2' and the imprint of the second counter-mould 3'.

For this, the inflatable pressure member 6 is configured to develop between an idle state, wherein the bladder balloon is called "deflated" and can be inserted without stress between the counter-moulds 3, 3', and a stressed state, wherein the bladder balloon is called "inflated", and wherein it flattens the counter-moulds 3, 3' against the moulds 2, 2' thereof.

Figure 8A:
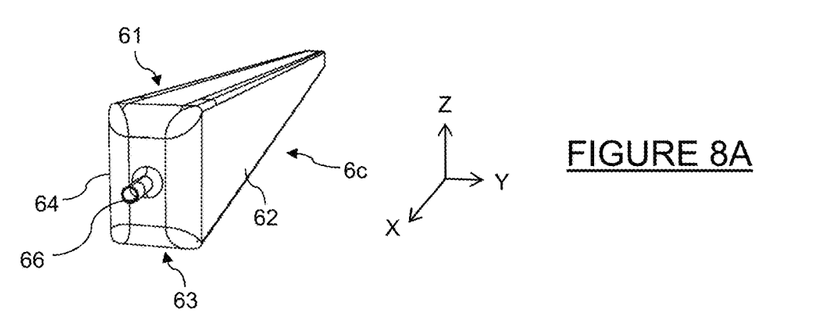

In this example, with reference to FIG. 8A, the inflatable pressure member 6 has a substantially rectangular parallelepiped shape to cooperate with the inner face 3a of the first counter-mould 3 and with the inner face 3a' of the second counter-mould 3' (FIG. 4). In this regard, with reference to FIG. 8A, the inflatable pressure member 6 comprises, in this example, four faces 61, 62, 63, 64. Preferably, the inflatable pressure member 6 comprises one or more access openings 66 to make it possible for the inflating/deflating thereof. The access opening 66 is formed at a longitudinal end of the inflatable pressure member 6 and protrudes out of the moulds 2, 2' so as to make it possible for an inflating/deflating when the moulds 2, 2' are closed.

Preferably, the inflatable pressure member 6 is made of a flexible material that could resist very high temperatures of up to 450° C., more preferably of up to 600° C. Also preferably, the flexible material can resist an inner pressure of up to 9 bars (9000 hPa), more preferably of up to 15 bars (15000 hPa). The cross-section of the inflatable pressure member 6 can advantageously develop according to the inflating state thereof as will be presented below.

Preferably, the inflatable pressure member 6 is made of polyimide which meets the temperature and pressure limits. The material known under its commercial name "Thermalimide" from the company Airtech is suitable, for example, for this application. Such a material also has increased demoulding properties, making it possible for an easy and quick removal of the inflatable pressure member 6 after producing thermoplastic parts 100.

According to an aspect of the invention, when the inflatable pressure member 6 is made of polyimide, the material of the inflatable pressure member has a thickness of between 25 μm and 100 μm, preferably of around 50 μm, so as to ensure a compromise between resistance to heat/pressure and flexibility. Such an inflatable pressure member 6 advantageously makes it possible to be adapted to the shape of the counter-mould, because of the low thickness thereof, which increases the flexibility. The inflatable pressure member 6 can thus apply a homogenous pressure force without being stretchable.

Alternatively, the inflatable pressure member 6 is made of silicone and has a thickness of between 1 mm and 7 mm, preferably of around 5 mm. Such an inflatable pressure member 6 advantageously makes it possible to be stretched during the inflating but has a greater thickness.

Figure 8B:
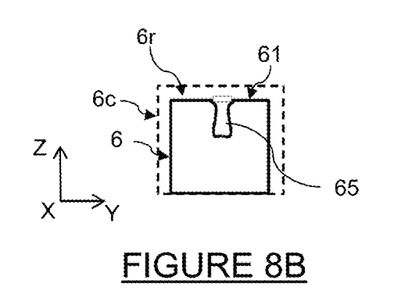
Figure 8C:
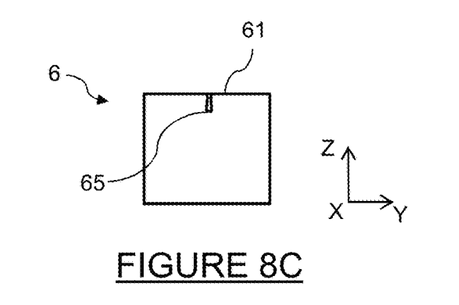

According to a preferred embodiment of the invention, in reference to FIGS. 8B and 8C, the inflatable pressure member 6 has, in the idle state, an idle shape 6r substantially similar to the stressed shape 6c of the inflatable pressure member 6. Indeed, given the thermal resistance and the pressure resistance properties thereof, the inflatable pressure member 6 is not stretchable in the manner of a balloon. Only the dimensions of the inflatable pressure member 6 differ between the two states. In this example, the inflatable pressure member 6 comprises, in the idle state, on one of the four faces thereof, at least one fold 65 or inner protrusion (represented in FIG. 8B), extending inside the inflatable pressure member 6, so as to not create any excrescence outside on the counter-mould 3, 3', which would generate a heterogeneous flattening force on the counter-mould 3, 3' and would negatively affect the shape of the thermoplastic part to be produced 100. One or more folds 65 are advantageous when the inflatable pressure member 65 is made of polyimide, given that the folds 65 limit the risk of rupture in case of excessive inflating, the polyimide not being stretchable.

When the inner pressure increases in the inflatable pressure member 6, i.e. when the bladder balloon passes from the idle state (FIG. 8B) to the stressed state (FIG. 8C), the cross-section of the inflatable pressure member 6 is configured to increase by deploying the fold 65 of which the dimension is reduced as will be represented in FIG. 8C. Such a fold 65 thus makes it possible to increase the volume of the inflatable pressure member 6 without stretching it, so as to achieve the final shape thereof when the inflatable pressure member 6 is pressurised.

As described above, the inflatable pressure member 6 is advantageously configured to, in the stressed state, be flattened against the inner face 3a, 3a' of each counter-mould 3, 3', so as to flatten each rough part P between the inner face 2a, 2a' of the mould 2, 2' and the outer face 3b, 3b' of the counter-mould 3, 3'. In other words, each rough part P, P' is sandwiched and pressurised between a mould 2, 2' and a counter-mould 3, 3'.

Such a moulding module M advantageously makes it possible for the simultaneous production of two large thermoplastic parts 100, having in this example, a length greater than 5 metres, without risking the offsetting of a mould with respect to another, given that they remain fixed during the compression. In addition, the production system 1 according to the invention makes it possible to produce a thermoplastic part 100 by ensuring a homogenous flattening shape over the whole length while resisting an increased heating temperature, necessary to melt the thermoplastic matrix in order to consolidate the rough part P during the compression.

Figure 9:
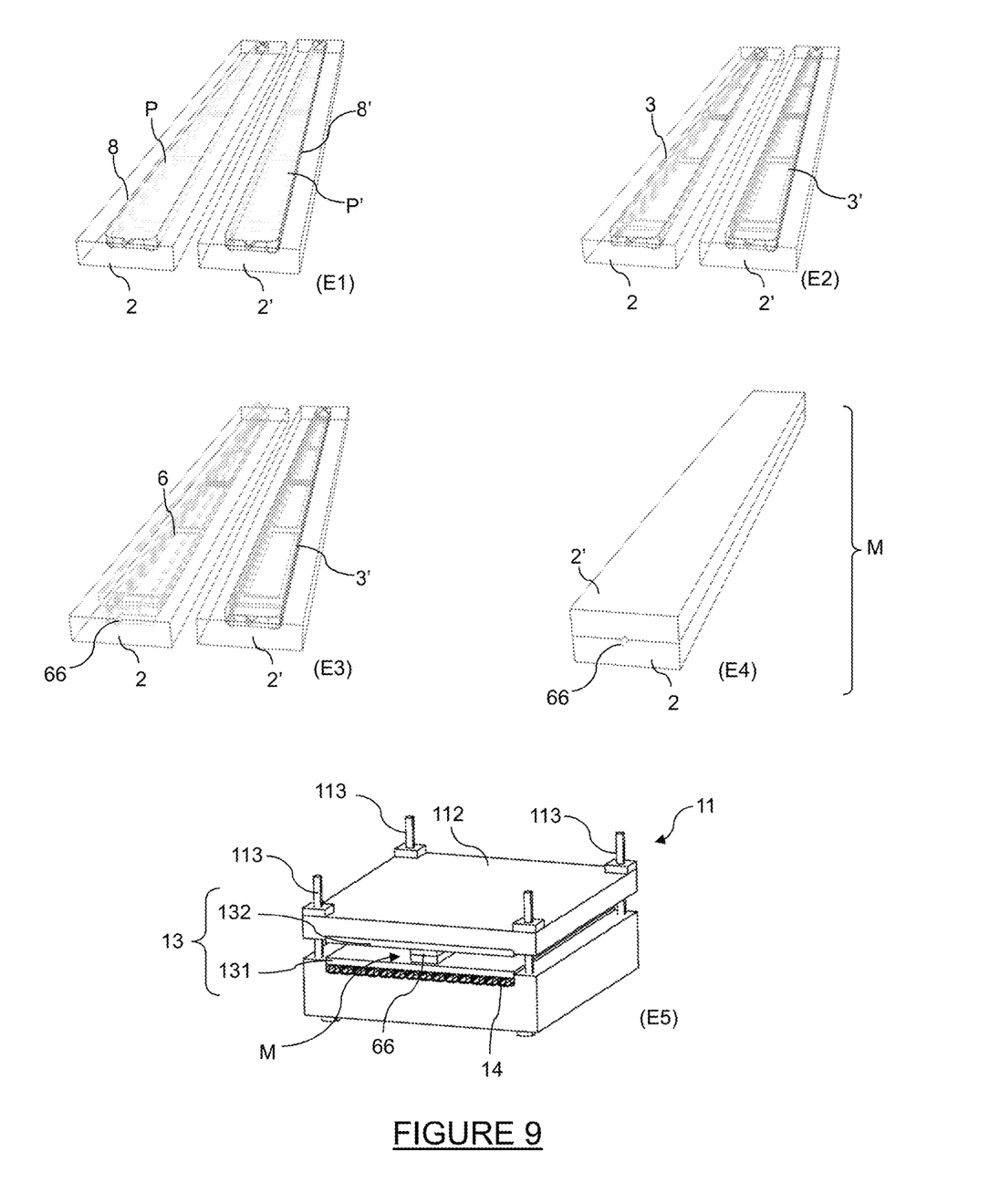
FIG. 9 represents steps of a production method according to an embodiment of the invention.

A method for producing two thermoplastic parts 100, 100' from two rough parts P, P' will now be described, according to a preferred implementation of the invention with reference to FIG. 9.

In this example, the production method advantageously makes it possible to simultaneously produce two thermoplastic parts 100, 100'. Each thermoplastic part 100, 100' is produced from a rough part P, P', which has been made before.

In a first step E1, a first rough part P is positioned in the imprint 8 of the first mould 2 corresponding to the outer face 100b of the first thermoplastic part to be produced 100. More specifically, the outer face Pb of the rough part P is put into contact with the imprint 8 of the first mould 2. Similarly, a second rough part P' is positioned in the imprint 8' of the second mould 2'.

Then, in a second step E2, the outer face 3*b* of the first counter-mould 3 is positioned in the cavity of the U of the first rough part P, i.e. against the inner face Pa thereof. In other words, the imprint 9 of the first counter-mould 3, corresponding to the inner face 100*a* of the first thermoplastic part to be produced 100, is in contact with the inner face Pa of the first rough part P. As indicated above, the positioning of the first counter-mould 3 is facilitated if the first counter-mould 3 comprises means for adjusting the clearance. Similarly, the second counter-mould 3' is positioned in the cavity of the U of the second rough part P' in the second step E2.

In a third step E3, the inflatable pressure member 6 is then inserted, in the idle state thereof, against the inner face 3*a* of the first counter-mould 3. The access opening 66 protrudes from the first mould 2 so as to make it possible for an inflating/deflating when the moulds 2, 2' are closed.

Then, during a fourth step E4, the moulding module M is assembled by positioning the second counter-mould 3' on the inflatable pressure member 6, symmetrically to the first counter-mould 3. The second mould 2' is thus positioned opposite the first mould 2, so as to sandwich the two rough parts P, P', the two counter-moulds 3, 3', as well as the inflatable pressure member 6.

In a fifth step E5, the moulding module M formed before is thus placed in the closing device 11, which prevents any relative movement between the moulds 2, 2'. In practice, the moulding module M is positioned on the lower blocking member 111 then the upper blocking member 112 is lowered against the moulding module M then locked in position to prevent any clearance. Advantageously, the inflatable coils are inflated to produce an optimal flattening over the length of the moulding module M.

The heating device 13 is then activated so as to reach a temperature T of 600° C. in order to make the thermoplastic matrix of the rough parts P, P' malleable. Then, the inflatable pressure member 6 is placed in the stressed state thereof, by increasing the inner pressure thereof up to a pressure value of 8 bars (8000 hPa). Such an increase of the inner pressure leads to the deployment of the outer casing of the inflatable pressure member 6, in particular, a deployment of the fold 65, such that the inflatable pressure member 6 is unfolded and optimally flattens each counter-mould 3, 3' against the rough parts P, P'. Thus, the rough parts P, P' are sandwiched between a mould 2, 2' and a counter-mould 3, 3' in order to mould the shape of the imprints 8, 9, 8', 9' thereof. The porosity of the rough parts P, P' decreases so as to form finished thermoplastic parts 100, 100' with the required dimensions.

To release the finished thermoplastic parts 100, 100', the inflatable pressure member 6 is placed in the idle state thereof by decreasing the inner pressure thereof. Then, the moulding M assembly is removed from the closing device 11 to recover the finished thermoplastic parts 100, 100'.

Such a production method according to the invention makes it possible for the simple and quick formation of a plurality of thermoplastic parts simultaneously. Indeed, the temperature reached during the production method, being increased, and the thermoplastic parts advantageously resisting such temperatures, they are quickly softened. The use of a bladder balloon as a pressure member also makes it possible for an increase in quick and homogenous pressure, making it possible to flatten each face of the rough part between a mould and a counter-mould, making it possible to impart the inner imprint and the outer imprint, almost simultaneously, on the rough part. The production method according to the invention also advantageously makes it possible to produce large parts, which could reach 5 m long at increased production rates. Contrary to a thermosetting matrix, it is not necessary to heat for a long duration, heating for a few minutes thus being sufficient.

The invention has been presented above for producing two thermoplastic parts simultaneously, but it goes without saying that the invention could make it possible to produce them one by one, or to produce them in batches.

Figure 10:
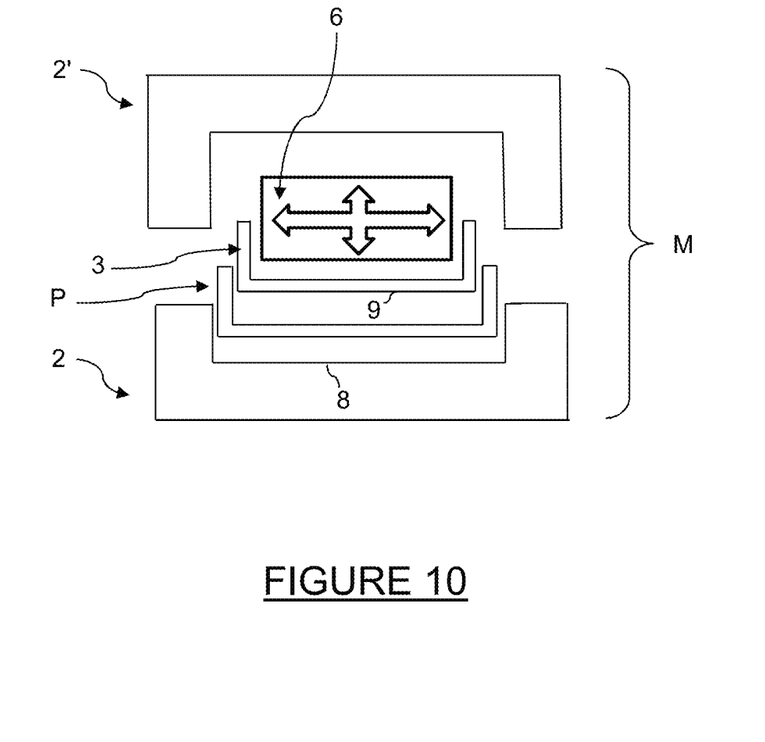
FIG. 10 is a schematic, perspective representation of a moulding module according to the invention to produce one single thermoplastic part.

As an example, with reference to FIG. 10, to produce one single thermoplastic part, all that is needed is to form a moulding M assembly only comprising a first mould 2 with an imprint 8, a first counter-mould 3 with an imprint 9, a pressure member 6 and a second mould 2' to make it possible for the pressure member 6 to stress the first counter-mould 3 against the first mould 2. It is not necessary for the second mould 2' to comprise an imprint.

The invention claimed is:

1. A system for producing at least one structural thermoplastic part, intended to be integrated in a primary structure of an aeroplane, said structural thermoplastic part being formed from a rough part comprising reinforcing fibres immersed in a thermoplastic matrix, the structural thermoplastic part to be produced comprising an outer face and an inner face, opposite the outer face, the production system comprising:
   a first mould, comprising an inner imprint intended to form the outer face of the thermoplastic part to be produced,
   a first counter-mould comprising an outer imprint intended to form the inner face of the thermoplastic part to be produced, the rough part being intended to be mounted between the first mould and the first counter-mould,
   a second mould configured to be mounted opposite the first mould,
   a device for closing the moulds so as to prevent a gap between them,
   a device for heating the rough part at a heating temperature greater than the melting temperature of the thermoplastic matrix, so as to make it malleable,
   at least one inflatable pressure member made of a material having a thermal resistance greater than the heating temperature, the inflatable pressure member being mounted against the first counter-mould and the second mould,
   the inflatable pressure member being configured to develop between a deflated idle state and an inflated stress state, wherein the inflatable pressure member is configured to flatten the rough part between the imprint of the first mould and the imprint of the first counter-mould so as to consolidate the rough part and to form the structural thermoplastic part.

2. The system according to claim 1, wherein the imprint of the first mould has a length greater than 5 m.

3. The system according to claim 1, wherein the inflatable pressure member is configured to resist a heating temperature at least equal to 350° C.

4. The system according to claim 1, wherein the inflatable pressure member is configured to resist a heating temperature at least equal to 600° C.

5. The system according to claim 1, wherein the inflatable pressure member is made of a polyimide or silicone type material.

6. The system according to claim 1, wherein the inflatable pressure member is inflated at an inner pressure of between 1 bar (1000 hPa) and 15 bars (15000 hPa).

7. The system according to claim 1, wherein the inflatable pressure member is inflated at an inner pressure of between 7 bars (7000 hPa) and 12 bars (12000 hPa).

8. The system according to claim 1, wherein, the second mould comprising a second imprint, said production system comprising a second counter-mould mounted between the inflatable pressure member and the second mould, the inflatable pressure member is configured to, in the stressed state thereof, flatten both a first rough part between the first counter-mould and the first mould and a second rough part between said second counter-mould and the second mould so as to make it possible for the simultaneous production of two structural thermoplastic parts.

9. The system according to claim 1, wherein the first counter-mould comprises a first part and a second part which are connected by means for adjusting the clearance.

10. The system according to claim 1, wherein the first counter-mould comprises a first part and a second part which are connected by a flexible portion for adjusting the clearance.

11. The system according to claim 1, wherein the inflatable pressure member comprises, in the idle state, at least one inner fold.

12. The system according to claim 1, wherein the first counter-mould is made of a material having a thermal expansion coefficient which is similar to that of the rough part.

13. A production method by the production system according to claim 1 of a structural thermoplastic part from a rough part, the rough part being positioned between the imprint of the first mould and the imprint of the first counter-mould, the inflatable pressure member being in a deflated idle state, said method comprising:
- a step of heating the thermoplastic matrix of the rough part so as to make it malleable, and
- a step of inflating the inflatable pressure member in an inflated stressed state wherein the inflatable pressure member flattens the rough part between the imprint of the first mould and the imprint of the first counter-mould so as to consolidate the rough part and to form the structural thermoplastic part.

* * * * *